Dec. 19, 1933. J. DIAS 1,939,958
VEGETABLE HILLER
Filed Jan. 20, 1933

INVENTOR
John Dias
BY
ATTORNEY

Patented Dec. 19, 1933

1,939,958

UNITED STATES PATENT OFFICE 1,939,958

VEGETABLE HILLER

John Dias, Pescadero, Calif.

Application January 20, 1933. Serial No. 652,596

6 Claims. (Cl. 97—56)

This invention relates to agricultural implements and particularly to a vegetable hilling device. My principal object is to provide a device for the purpose adapted to be attached to any suitable implement frame by means of which rows of vegetables and like plants may be efficiently hilled to any height, according to the age of growth of the plants or the width of the rows, merely by making certain necessary simple adjustments to the device. A further object is to provide a hiller for the purpose so arranged that the dirt will be piled up simultaneously and evenly on both sides of the row, thus preventing a possibly excessive amount of dirt from being banked against and tending to bend over the plants on one side or the other.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
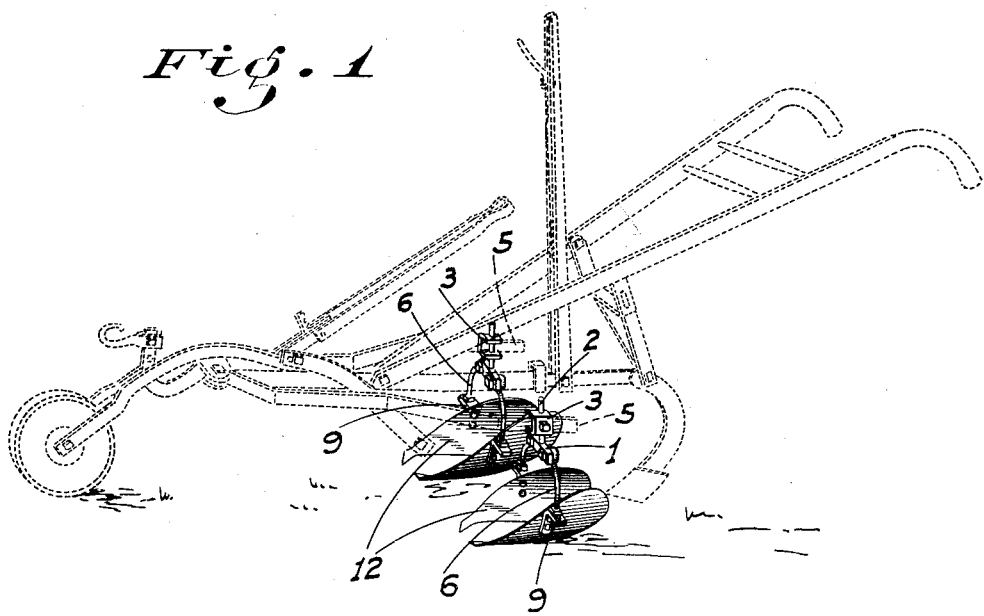
Fig. 1 is a perspective outline of a supporting implement frame showing a pair of my improved hilling devices applied thereto.
Figure 2:
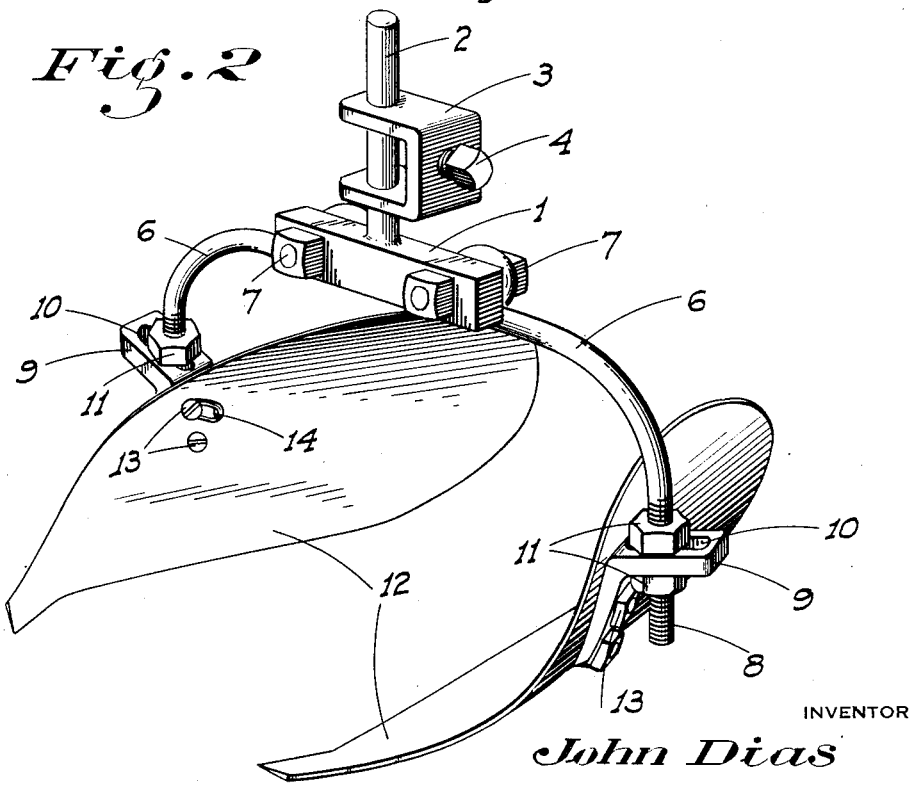
Fig. 2 is a perspective view of the device detached looking toward the rear.

Referring now more particularly to the characters of reference on the drawing, the numeral 1 denotes a horizontal bar from centrally of which a rigid stem 2 extends upwardly. This stem is slidably engaged by a C-yoke 3 having a set screw 4 in one side. This yoke is adapted to engage a side frame 5 of a supporting implement adjacent its rear end, said frame projecting through the yoke between the stem and said side.

Outwardly and downwardly curving arms 6 are swivelly clamped at their upper ends onto the rear face of the bar 1 by bolts 7 or the like, so that said arms may be swung in a transverse vertical plane. At their lower and normally vertical ends the arms are threaded as at 8 and engage the horizontal portions of angle brackets 9 which have slots 10 therein through which the arms turnably and slidably project, and through which said arms are also axially adjustable. The arms are clamped to the brackets by nuts 11 screwed on said arms and engaging the opposite sides of the brackets. The depending portions of the brackets are curved to follow the contour of and engage the outer sides of opposed symmetrical hilling blades 12 of mold board form. Each blade is adjustably clamped to its bracket by bolts 13, one of which works in a slot 14 in the blade concentric with the other bolt.

By means of the above arrangement of parts it will be seen that the hilling blades may be adjusted so as to occupy almost any position relative to each other and to the ground so as to meet all conditions of operation which may be encountered. By loosening the screw 4 so as to free the stem the height of the device as a whole relative to the supporting frame 5 will be altered by raising or lowering the stem. By loosening the clamping bolts the hilling blades may be turned so that the included angle is altered or they may be drawn apart or together without altering their angular relation. The spacing between the hilling blades may be additionally altered by swinging the arms 6 on their bolts 7 (which operation also alters the angular setting of the blades in a vertical plane) and by adjusting the bolts 11 along the arms in conjunction with the arm swinging movement. Alteration of the angular setting of the hilling blades relative to the ground in a longitudinal direction may be obtained by turning them about the pivot bolts 13 as an axis.

As a result the blades may be readily set so that hills of any width or height within reason can be thrown up and engaged with the plants as the size or nature of the same may require. In operation a pair of the hilling units are mounted on the frames 5 of the implement so that spaced rows of plants pass between the corresponding pairs of hilling blades. With the forward movement of the implement the ground is engaged by the points of the blades working between the rows and is thrown up evenly and symmetrically on both sides of the rows of plants, to whatever height is desired and according to the setting or adjusting of the blades as above described. The bar 1 is sufficiently high to enable the plants to pass under the bar without interference, and the blade supporting arms 6 are arranged relative to the blades and to the bar so as not to interfere with the plants.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A plant hilling device comprising a pair of opposed and cooperating blades spaced apart and adapted to engage the dirt to the sides of a row of plants, brackets projecting laterally from the blades, said brackets having longitudinal slots, supporting arms depending through the slots from above and both turnable and slidable therein, and means to clamp the arms at any position relative to the slots.

2. A plant hilling device comprising a pair of opposed and cooperating blades spaced apart and adapted to engage the dirt to the sides of a row of plants, brackets projecting laterally from the blades, said brackets having longitudinal slots, supporting arms depending through the slots from above and being turnable in and slidable along and axially movable in the slots, and clamping bolts adjustably threaded on the arms and engaging the opposite faces of the brackets.

3. A plant hilling device comprising a pair of opposed and cooperating blades spaced apart and adapted to engage the dirt to the sides of a row of plants, a horizontal bar extending transversely of and above the blades, means for mounting the bar in connection with an implement, arms extending downwardly from one vertical face of the bar, means rigidly connecting the lower ends of the arms to the blades, and means for adjustably clamping the arms to the bar for pivotal movement in a vertical transverse plane.

4. A plant hilling device comprising a pair of opposed and cooperating blades spaced apart and adapted to engage the dirt to the sides of a row of plants, a horizontal bar extending transversely of and above the blades, means for mounting the bar in connection with an implement, arms extending downwardly from the bar, means adjustably clamping the arms to the bar for pivotal movement in a vertical transverse plane, and means adjustably clamping the blades to the lower ends of the arms for vertical movement relative thereto.

5. A plant hilling device for attachment to a horizontal frame member of a cultivator comprising a vertical C-yoke adapted to straddle the frame, a stem slidable in the yoke, the frame being received between the stem and the back of the yoke, means to clamp the yoke against the frame and hold the stem against movement, a cross bar rigid with the lower end of the stem, and a pair of hilling blades supported from the bar.

6. A plant hilling device comprising a bar, means to mount the bar transversely on an implement, arms extending outwardly and then downwardly from and abutting against one vertical face of the bar, means to adjustably clamp the arms on the bar in pivotal relation thereto, and hilling blades supported on the lower ends of the arms.

JOHN DIAS.